United States Patent
Pu et al.

(10) Patent No.: US 9,635,168 B2
(45) Date of Patent: Apr. 25, 2017

(54) MOBILE INTELLIGENT TERMINAL WITH FUNCTIONS OF SMART PHONE AND PERSONAL COMPUTER

(71) Applicant: Beijing Jiatuosi Technology Co., Ltd., Beijing (CN)

(72) Inventors: Ting Pu, Beijing (CN); Huayang Xu, Beijing (CN); Meng Shao, Beijing (CN); Guanglei Zhou, Beijing (CN); Haijie Zhou, Beijing (CN); Shicheng Li, Beijing (CN); Bo Yang, Beijing (CN)

(73) Assignee: BEIJING JIATUOSI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/191,520

(22) Filed: Jun. 23, 2016

(65) Prior Publication Data
US 2016/0366272 A1   Dec. 15, 2016

Related U.S. Application Data

(63) Continuation of application No. PCT/CN2016/082954, filed on May 23, 2016.

(30) Foreign Application Priority Data

Jun. 15, 2015  (CN) .......................... 2015 1 0328789

(51) Int. Cl.
*H04B 1/40* (2015.01)
*H04M 1/725* (2006.01)
*H04W 4/14* (2009.01)

(52) U.S. Cl.
CPC ... *H04M 1/72569* (2013.01); *H04M 1/72522* (2013.01); *H04W 4/14* (2013.01)

(58) Field of Classification Search
CPC .......... H04M 1/72522; H04M 1/72563; G06F 1/1673
USPC ........................................................ 455/74
See application file for complete search history.

(56) References Cited

U.S. PATENT DOCUMENTS

2015/0189066 A1* 7/2015 Wu .................. H04M 1/72527
                                                          455/557

\* cited by examiner

*Primary Examiner* — Eugene Yun

(57) ABSTRACT

A mobile intelligent terminal with functions of a smart phone and a personal computer, including a device body and a hardware part and an operating system arranged therein; the hardware part keeping data exchange with the operating system, the hardware part is connected to all parts of the device body, and the hardware part includes a common area, a dedicated mobile phone area and a dedicated computer area; both the dedicated mobile phone area and the dedicated computer area keep exchange data with the common area; the mobile intelligent terminal realizes a mobile application mode by combining the common area, the dedicated mobile phone area and the operating system, and the mobile intelligent terminal realizes a computer application mode by combining the common area, the dedicated computer area and the operating system. The mode switch can switch the device from a mobile application mode to a computer application mode.

11 Claims, 3 Drawing Sheets

MOBILE INTELLIGENT TERMINAL WITH FUNCTIONS OF SMART PHONE AND PERSONAL COMPUTER

CROSS-REFERENCE TO RELATED APPLICATIONS

The present application is a Continuation Application of PCT application No. PCT/CN2016/082954 filed on May 23, 2016, which claims the benefit of Chinese Patent Application No. 201510328789.8 filed on Jun. 15, 2015, the contents of which are hereby incorporated by reference.

FIELD OF THE INVENTION

The invention relates to a mobile intelligent terminal, in particular to a mobile intelligent terminal with functions of a smart phone and a personal computer in the electronic information field.

BACKGROUND

With the rapid development of semiconductor technology, CPU used currently in a smart phone already has the computing capacity required by a personal computer. Existing smart phones can not only make a phone call and send text messages but also browse a webpage, watch movies, play games, view pictures, read a novel and enjoy music. However, they would play the role of a "content consumer" rather than a "content producer" due to limited screen size, small keyboard and the defect of failing to be connected to an external mouse. This means that a certain degree of content production work must be completed in a laptop or a personal computer, including CAD drawing plotting, post production in movie making, programming and code compiling, document editing, audio processing, etc. Unfortunately, existing smart phones cannot provide a large screen size, a regular keyboard and mouse required by the above work. Thus, many workers have to carry a laptop computer with large volume when they go out for business.

Meanwhile, a micro DLP projector has made great progress in performance of the light engine and DMD (digital lighting module) technology, which is revealed in significantly increased projection resolution and brightness and continuously reduced size. In addition, reliability and practicability of an infrared keyboard projector can be guaranteed basically due to the rapid development of an image recognition technique. However, as the overall hardware architecture of smart phones is not deeply integrated and smart phones are not improved and optimized at an operating system level, current mini projector and infrared laser keyboard can only function as an independent peripheral of a smart phone and cannot implement the function provided by a traditional personal computer in a real sense.

SUMMARY OF THE INVENTION

Aiming at the above problems, the invention is to provide a mobile intelligent terminal with functions of a smart phone and a personal computer, which not only has the size and function of a smart phone but also can implement functions of a personal computer via a projection screen and a projection keyboard.

In order to achieve the objectives, the technical solution is as follows:

A mobile intelligent terminal with functions of a smart phone and a personal computer, including a device body and a hardware part and an operating system arranged in the device body, the said hardware part keeping data exchange with the said operating system, the said hardware part is connected to all parts of the device body, and the said hardware part includes a common area, a dedicated mobile phone area and a dedicated computer area; both the said dedicated mobile phone area and the said dedicated computer area keep exchange data with the common area; the said mobile intelligent terminal realizes a mobile application mode by combining the common area, the dedicated mobile phone area and the operating system, and the said mobile intelligent terminal realizes a computer application mode by combining the common area, the dedicated computer area and the operating system.

Further, the said device body includes a projection keyboard module, a mode switch, a camera with filter, a red line laser module, a projection lens and a focusing roller; the projection keyboard module is used for generating a virtual keyboard; the red line laser module emits an infrared laser and the infrared laser will be reflected by fingers operating the virtual keyboard; the camera with filter captures a finger image reflecting infrared laser, and cooperates with the hardware part to implement the character inputting function of a regular keyboard; the projection lens projects a picture displayed on the device body onto a projection screen; the focusing roller adjusts focal length of the projection lens; the mode switch opens or closes a virtual keyboard and a projection screen, and switches the operating system from a mobile application mode to a computer application mode.

Further, The operating system includes a kernel layer, a system runtime layer, an application framework layer and an application layer; the kernel layer is oriented to the hardware part directly, and the kernel layer includes a driver program of a dedicated mobile phone hardware, a common hardware and a dedicated computer hardware; the system runtime layer is above the kernel layer, and the system runtime layer includes a program library and a runtime library; the program library is used by different system components in the operating system and services users via the application framework layer; the runtime library includes a core library and a virtual machine, which provide a program library calling interface for the application framework layer and provide a virtual machine to efficiently run a plurality of applications at the same time; the application framework layer provides users with an API required for accessing to the core library; the application layer provides users with such services that can be use directly.

Further, the application layer includes a dedicated mobile application running in a mobile mode, a common application running in a mobile mode and a computer mode, and a dedicated computer application running in a computer mode.

Further, the dedicated mobile application includes a HOME function program, a telephone and address book or a camera application of a smart phone; the common application includes a browser, a game, a map or a multimedia application; the dedicated computer application includes CAD, 3D Max, Visual Studio or an Office application.

Further, the dedicated computer area includes a projection keyboard port, a second camera port, a second slave CPU, a LED light source and a DMD chip; the projection keyboard module and the red line laser module are managed and controlled by the common area through the projection keyboard port; the second camera port is connected to the camera with filter for transmitting the acquired image information to the common area and providing input data for the image recognition algorithm in the common area; the focusing roller is mechanically connected to the projection lens, and focal length thereof is directly adjusted by the focusing roller; the second slave CPU keeps data exchange with the common area and controls the LED light source drive and the DMD chip, so as to implement screen projection and image display of the light engine.

Further, the common area includes a main structure, a communication module, an audio input and output module and a key interface; wherein the communication module and the audio input and output module keep data exchange with the main structure respectively, the key interface is connected to the mode switch, and information of the mode switch is transmitted to the main structure through the key interface, so as to switch the operating system between a mobile mode and a computer mode; the main structure stores and calculates data in the operating system, controls and manages all of the hardware.

Further, the device body also includes a shell, a Home key, a front camera and a rear camera; the dedicated mobile area includes a first slave CPU, a mobile communication module, a touch screen port, an LCD port, a Home key port and a first camera port; the mobile phone communication module keeps data exchange with the main structure via the first slave CPU, and the first slave CPU together with the mobile phone communication module implements encoding and decoding, sending and receiving of telephone and SMS signals; the touch screen port and the LCD port are connected to the touch screen, so as to keep data exchange with the main structure; the Home key port is connected to the Home key; the first camera port is connected to the front camera and the rear camera, and the image information acquired by the camera is transmitted to the main structure.

Further, the projection keyboard module is arranged on one side of the shell of the device body for generating a virtual keyboard on the desktop; the mode switch, the camera with filter, an audio and the red line laser module are sequentially arranged below the projection keyboard module on the side of the shell; the other side of the shell is provided with two USB interfaces for charging the device body and connecting it to a peripheral unit.

Further, the communication module is connected to a Wi-Fi module, a Bluetooth module or a USB interface, the Bluetooth module is used to connect a Bluetooth mouse, the USB interface is connected to a mobile hard disk, and the audio input and output module is connected to a headphone jack, an audio or a microphone.

Furthermore, the communication module is connected to a Wi-Fi module, a Bluetooth module or a USB interface, the Bluetooth module is used to connect a Bluetooth mouse, the USB interface is connected to a mobile hard disk, and the audio input and output module is connected to a headphone jack, an audio or a microphone.

The invention has the following advantages due to the above technical solutions that:

1. The invention provides a virtual projection keyboard, a projection screen and a wireless mouse connected to a Bluetooth module, thus having all input and output terminals of a traditional personal computer on the premise of an undersized device body.

2. The invention deeply integrates overall hardware architecture, improves and optimizes the operating system, thus allowing the device to not only have all functions of a smart phone and a personal computer but also implement rapid switch between two modes. The invention can be widely used in both communication and computer fields.

DESCRIPTION OF THE PREFERRED EMBODIMENTS

The invention will be further described in detail in combination with drawings and examples.

Figure 1:
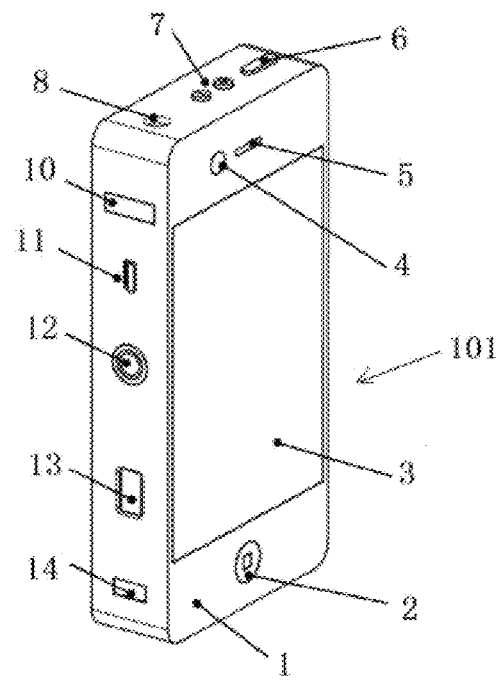
FIG. 1 is a structural diagram of the invention.
Figure 2:
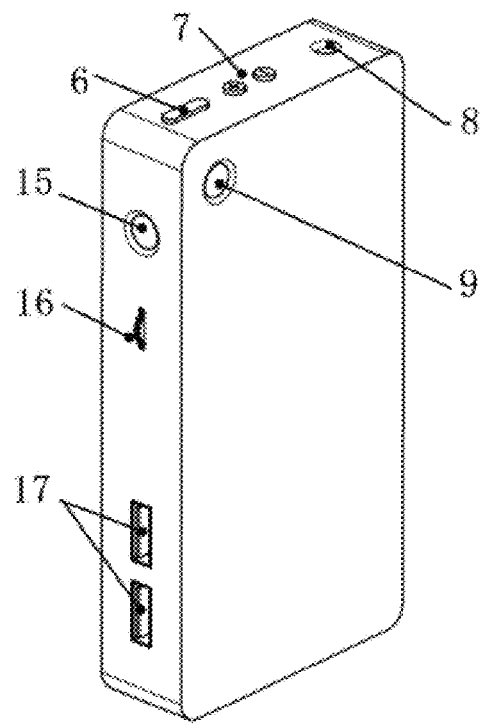
FIG. 2 is a rear view of FIG. 1.

As shown in FIG. 1 and FIG. 2, the invention provides a mobile intelligent terminal with functions of a smart phone and a personal computer, including a device body 101 and a hardware part 102 and an operating system 103 arranged therein. The device body 101 supports two modes (i.e. a smart phone mode and a personal computer mode) with the help of the hardware part 102 and the operating system 103, which can implement one-key switchover by the means of software/hardware. The device body 101 includes a shell 1, a Home key 2, a touch screen 3, a front camera 4, a handset 5, an ON/OFF button 6, a volume button 7, a headphone jack 8 and a rear camera 9 of any regular mobile phone. The front of the shell 1 is provided with a touch screen 3, below which the Home key 2 is arranged and above which a front camera 4 and a handset 5 are arranged. The upper end surface of the shell 1 is provided with an ON/OFF button 6, a volume button 7 and a headphone jack 8; and a rear camera 9 is arranged above and behind the shell 1. The device body 101 also includes a projection keyboard module 10, a mode switch 11, a camera with filter 12, an audio 13, a red line laser module 14, a projection lens 15, a focusing roller 16 and a USB interface 17.

Figure 3:
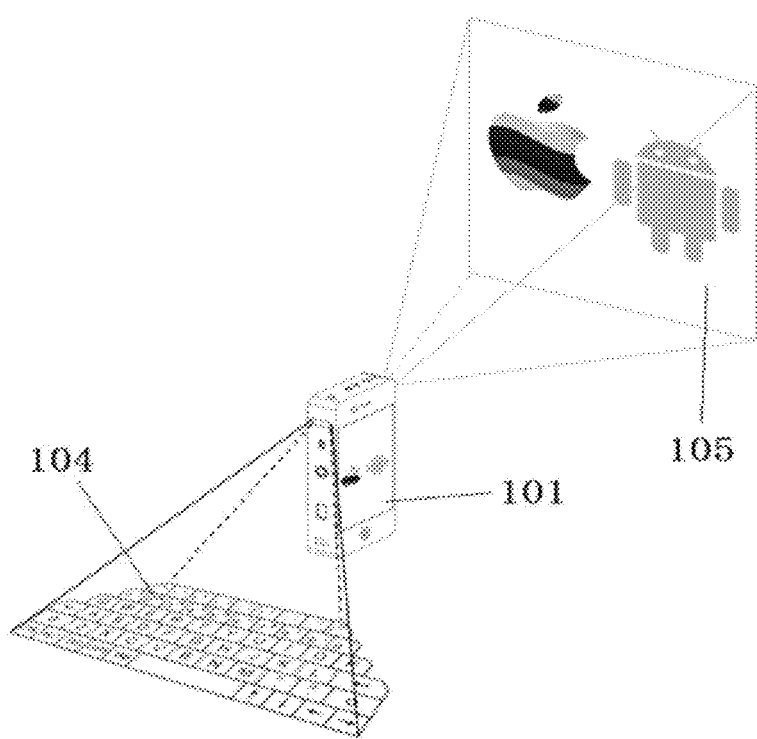
FIG. 3 is a structural diagram of the user mode of the invention.

As shown in FIG. 1, the projection keyboard module 10 is arranged on the left side end face of the shell 1 for generating a virtual keyboard 104 on the desktop (as shown in FIG. 3); the mode switch 11, the camera with filter 12, the audio 13 and the red line laser module 14 are sequentially arranged below the projection keyboard module 10 on the left side end face of the shell 1; wherein infrared laser emitted by the red line laser module 14 is reflected by fingers pressing the virtual keyboard 104, and the camera with filter 12 captures a finger image reflecting infrared laser, and implement the character inputting function of a regular keyboard with the help of an image recognition algorithm of the hardware part 102. The mode switch 11 can be pushed to open or close the projection keyboard 104 and the projection screen 105 at the same time, and switch the operating system 103 between a mobile application mode and a computer application mode, which can be implemented by corresponding software button on the touch screen 3; and the audio 13 can provide high quality audio output for the device body 101.

As shown in FIG. 2, a projection lens 15, a focusing roller 16 and a USB interface 17 are sequentially arranged on the right side end face of the shell 1 from top to bottom. The projection lens 15 projects a picture displayed on the touch screen 3 onto a projection screen 105 (as shown in FIG. 3), the virtual keyboard 104 and the projection lens 105 are combined to enable the device body 101 to have functions of a personal computer; the medium used for the projection screen 105 may be white wall, curtain or other objects with single color, flat surface and poor light reflection. The focusing roller 16 adjusts the focal length of the projection lens 15; the USB interface 17 can be set as two to charge the device body 101 and connect it to a peripheral unit.

Figure 4:
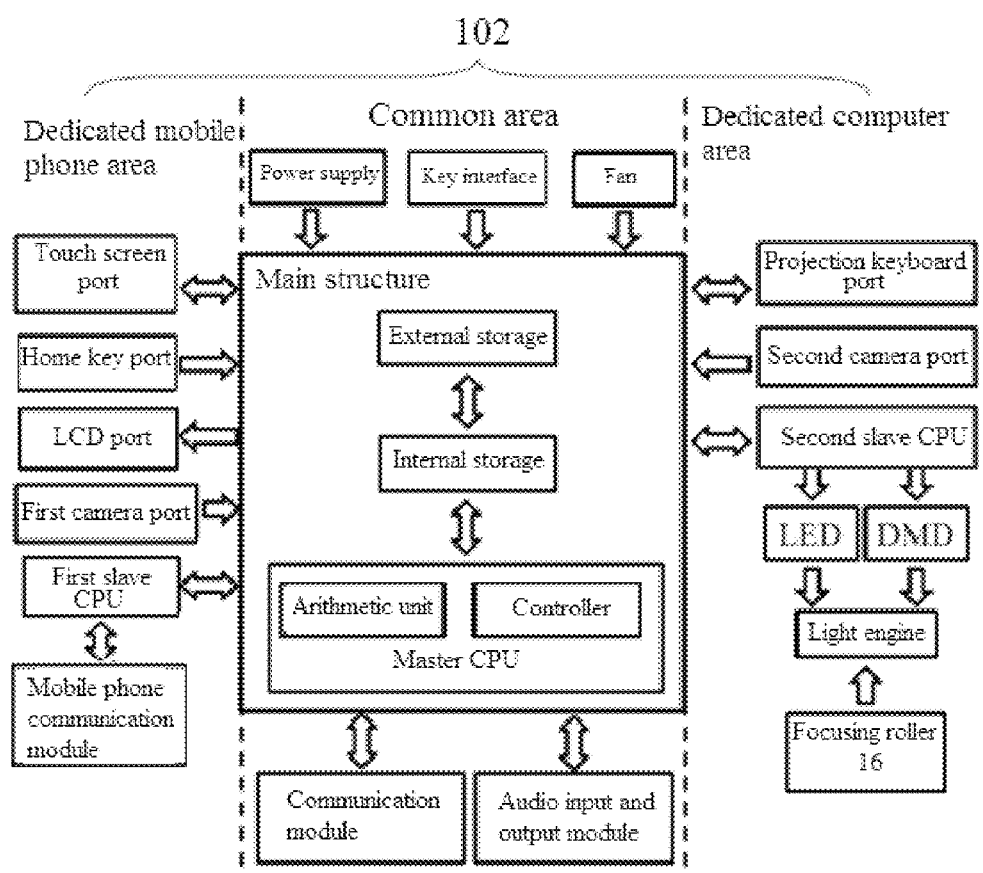
FIG. 4 is a structural diagram of the hardware part of the invention.

As shown in attached FIG. 4, the hardware part 102 is connected to the device body 1, and the hardware part 102 is divided into a common area, a dedicated mobile phone area and a dedicated computer area; wherein the common area includes a main structure, a communication module, an audio input and output module and a key interface, the communication module and the audio input and output module keep data exchange with the main structure respectively, the key interface is connected to the mode switch 11, the ON/OFF button 6 and the volume button 7, and information of the mode switch 11 is transmitted to the main structure through the key interface, so as to switch between a mobile mode and a computer mode; the ON/OFF button 6 and the volume button 7 are controlled by the main structure via the key interface to implement respective function. The main structure is regular personal computer architecture responsible for data storage and calculation within the whole operating system 103 as well as controlling and management of all of the hardware. The main structure includes a master CPU (including an algorithm unit and a controller), an internal storage and an external storage; the master CPU keeps data exchange with the internal storage directly, and the internal storage keeps data exchange with the external storage directly. The internal storage includes RAM and ROM; and the external storage includes a SD card, a USB flash disk, a mobile hard disk and a cloud network disk. The communication module is connected to a Wi-Fi module, a Bluetooth module and a USB interface 17; the Bluetooth module is connected to a Bluetooth mouse and the USB interface 17 is connected to a mobile hard disk, both modules can be used in the device body 101 in a computer mode to implement the mouse and hard disk function of a traditional computer; and the audio input and output module can be connected to a headphone jack 8, an audio 13 or a microphone. The mobile mode and computer mode support the hardware used in the common area, and have respective dedicated hardware; wherein the main structure is provided with a power supply and a fan.

The dedicated mobile area includes a first slave CPU, a mobile communication module, a touch screen port, an LCD port, a Home key port and a first camera port. The mobile phone communication module keeps data exchange with the main structure in the common area via the first slave CPU, and the first slave CPU together with the mobile phone communication module implements encoding and decoding, sending and receiving of telephone and SMS signals. The touch screen port and the LCD port are connected to a touch screen 3 and keep data exchange with the main structure in the common area; the Home key port is connected to the Home key 2; the first camera port is connected to the front camera 4 and the rear camera 9, and image information acquired by the front camera 4 and the rear camera 9 is transmitted to the main structure in the common area.

The dedicated computer area includes a projection keyboard port, a second camera port, a second slave CPU, an LED light source, a DMD chip, a focusing roller 16 and a light engine, and the light engine includes a projection lens 15. The projection keyboard module 10 and the red line laser module 14 are managed and controlled by the common area through the projection keyboard port, to successfully generate a virtual keyboard 104 on the desktop; the second camera port is connected to the camera with filter 12 for transmitting the acquired image information to the common area and providing input data for the image recognition algorithm preset in the main structure of the common area, so as to judge which button of the virtual keyboard 104 pressed by the user finger at the same time; the focusing roller 16 is mechanically connected to the projection lens 15 of the light engine for adjusting the focal length thereof; the projection lens 15 generates the projection screen 105 and adjusts the distance and definition of the projection screen 105 via the focusing roller 16. The second slave CPU keeps data exchange with the common area, drives the LED light source and processes the projection signal, so as to implement the screen projection and image display function of the light engine by controlling the LED light source and the DMD chip.

Figure 5:
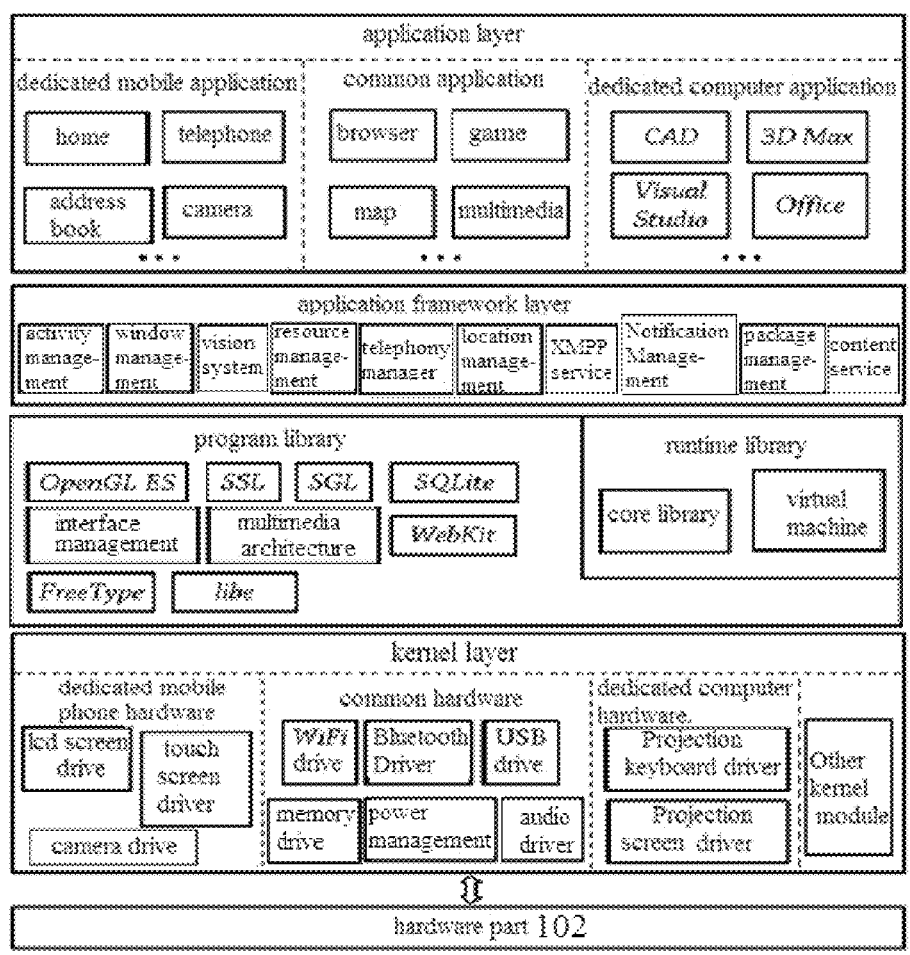
FIG. 5 is a structural diagram of the operating system and the hardware part of the invention.

As shown in FIG. 5, the hardware part 102 keeps data exchange with the operating system 103, and the operating system 103 includes a kernel layer, a system runtime layer, an application framework layer and an application layer;

Wherein as a system kernel at the lowest layer, the kernel layer is oriented to the hardware part 102 directly, and the kernel layer includes a driver program of dedicated mobile phone hardware, a common hardware and dedicated computer hardware.

The system runtime layer is above the kernel layer, and the system runtime layer includes a program library and a runtime library; wherein the program library is used by different system components in the operating system 103 and services users via the application framework layer; while the runtime library includes a core library and a virtual machine, which provide a program library calling interface for the application framework layer and provide a virtual machine to efficiently run a plurality of applications at the same time.

The application framework layer provides users with an API required for accessing to the core library, which facilitates users to conveniently develop and use any application without understanding and changing the underlying system.

The application layer provides users with such services that they can use directly, and is divided into a dedicated mobile application, a public application and a dedicated computer application by functionality; wherein the dedicated mobile application includes a HOME function program, a telephone and address book as well as the camera, which capable of running only in a phone mode to run; the common application includes a browser, a game, a map or a multimedia application capable of running in a phone mode and a computer mode; and the dedicated computer application includes CAD, 3D Max, Visual Studio and Office, which capable of running only in a computer mode.

The above examples are only used to describe the invention, so any structure, size, position and shape of each component can be changed. Any improvement and equivalent transformation on individual components made according to the principle of the invention shall not be excluded from the protection scope of the invention.

What is claimed is:

1. A mobile intelligent terminal with functions of a smart phone and a personal computer comprising a device body and a hardware part and an operating system arranged in the device body, the hardware part keeping data exchange with the operating system, wherein:

the hardware part is connected to all parts of the device body, and the hardware part comprises a common area, a dedicated mobile phone area and a dedicated computer area;

both the dedicated mobile phone area and the dedicated computer area keep exchange data with the common area;

the mobile intelligent terminal realizes a mobile application mode by combining the common area, the dedicated mobile phone area and the operating system, and the mobile intelligent terminal realizes a computer application mode by combining the common area, the dedicated computer area and the operating system;

wherein the operating system comprises a kernel layer, a system runtime layer, an application framework layer and an application layer;

the kernel layer is oriented to the hardware part directly, and the kernel layer comprises a driver program of dedicated mobile phone hardware, a common hardware and a dedicated computer hardware;

the system runtime layer is above the kernel layer, and the system runtime layer comprises a program library and a runtime library; the program library is used by different system components in the operating system and services users via the application framework layer; the runtime library comprises a core library and a virtual machine, which provide a program library calling interface for the application framework layer and provide a virtual machine to efficiently run a plurality of applications at the same time;

the application framework layer provides users with an API required for accessing to the core library;

the application layer provides users with such services that can be use directly.

2. The mobile intelligent terminal with functions of a smart phone and a personal computer according to claim 1, wherein:

the device body comprises a projection keyboard module, a mode switch, a camera with filter, a red line laser module, a projection lens and a focusing roller;

the projection keyboard module is used for generating a virtual keyboard;

the red line laser module emits an infrared laser and the infrared laser will be reflected by fingers operating the virtual keyboard;

the camera with filter captures a finger image reflecting infrared laser, and cooperates with the hardware part to implement the character inputting function of a regular keyboard;

the projection lens projects a picture displayed on the device body onto a projection screen;

the focusing roller adjusts focal length of the projection lens;

the mode switch opens or closes a virtual keyboard and a projection screen, and switches the operating system from a mobile application mode to a computer application mode.

3. The mobile intelligent terminal with functions of a smart phone and a personal computer according to claim 2, wherein the dedicated computer area comprises a projection keyboard port, a second camera port, a second slave CPU, a LED light source and a DMD chip;

the projection keyboard module and the red line laser module are managed and controlled by the common area through the projection keyboard port;

the second camera port is connected to the camera with filter for transmitting the acquired image information to the common area and providing input data for the image recognition algorithm in the common area;

the focusing roller is mechanically connected to the projection lens, and focal length thereof is directly adjusted by the focusing roller; the second slave CPU keeps data exchange with the common area and controls the LED light source drive and the DMD chip, so as to implement screen projection and image display of the light engine.

4. The mobile intelligent terminal with functions of a smart phone and a personal computer according to claim 3, wherein:

the common area comprises a main structure, a communication module, an audio input and output module and a key interface; wherein the communication module and the audio input and output module keep data exchange with the main structure respectively, the key interface is connected to the mode switch, and information of the mode switch is transmitted to the main structure through the key interface, so as to switch the operating system between a mobile mode and a computer mode;

the main structure stores and calculates data in the operating system, controls and manages all of the hardware.

5. The mobile intelligent terminal with functions of a smart phone and a personal computer according to claim 4, wherein the communication module is connected to a Wi-Fi module, a Bluetooth module or a USB interface, the Bluetooth module is used to connect a Bluetooth mouse, the USB interface is connected to a mobile hard disk, and the audio input and output module is connected to a headphone jack, an audio or a microphone.

6. The mobile intelligent terminal with functions of a smart phone and a personal computer according to claim 4, wherein:

the device body also comprises a shell, a Home key, a front camera and a rear camera;

the dedicated mobile area comprises a first slave CPU, a mobile communication module, a touch screen port, an LCD port, a Home key port and a first camera port;

the mobile phone communication module keeps data exchange with the main structure via the first slave CPU, and the first slave CPU together with the mobile phone communication module implements encoding and decoding, sending and receiving of telephone and SMS signals;

the touch screen port and the LCD port are connected to the touch screen, so as to keep data exchange with the main structure;

the Home key port is connected to the Home key;

the first camera port is connected to the front camera and the rear camera, and the image information acquired by the camera is transmitted to the main structure.

7. The mobile intelligent terminal with functions of a smart phone and a personal computer according to claim 6, wherein the communication module is connected to a Wi-Fi module, a Bluetooth module or a USB interface, the Bluetooth module is used to connect a Bluetooth mouse, the USB interface is connected to a mobile hard disk, and the audio input and output module is connected to a headphone jack, an audio or a microphone.

8. The mobile intelligent terminal with functions of a smart phone and a personal computer according to claim 6, wherein:

the projection keyboard module is arranged on one side of the shell of the device body for generating a virtual keyboard on the desktop;

the mode switch, the camera with filter, an audio and the red line laser module are sequentially arranged below the projection keyboard module on the side of the shell;

the other side of the shell is provided with two USB interfaces for charging the device body and connecting it to a peripheral unit.

9. The mobile intelligent terminal with functions of a smart phone and a personal computer according to claim 8, wherein the communication module is connected to a Wi-Fi module, a Bluetooth module or a USB interface, the Bluetooth module is used to connect a Bluetooth mouse, the USB interface is connected to a mobile hard disk, and the audio input and output module is connected to a headphone jack, an audio or a microphone.

10. The mobile intelligent terminal with functions of a smart phone and a personal computer according to claim 1, wherein the application layer comprises a dedicated mobile application running in a mobile mode, a common application running in a mobile mode and a computer mode, and a dedicated computer application running in a computer mode.

11. The mobile intelligent terminal with functions of a smart phone and a personal computer according to claim 10, wherein the dedicated mobile application comprises a HOME function program, a telephone and address book or a camera application of a smart phone;

the common application comprises a browser, a game, a map or a multimedia application;

the dedicated computer application comprises CAD, 3D Max, Visual Studio or an Office application.

* * * * *